US012762441B2

(12) United States Patent
Griffin et al.

(10) Patent No.: US 12,762,441 B2
(45) Date of Patent: Oct. 13, 2026

(54) OPTIMIZING A QUANTUM REQUEST

(71) Applicant: Red Hat, Inc., Raleigh, NC (US)

(72) Inventors: Leigh Griffin, Waterford (IE); Stephen Coady, Waterford (IE)

(73) Assignee: Red Hat, LLC, Raleigh, NC (US)

( * ) Notice: Subject to any disclaimer, the term of this patent is extended or adjusted under 35 U.S.C. 154(b) by 1129 days.

(21) Appl. No.: 17/591,684

(22) Filed: Feb. 3, 2022

(65) Prior Publication Data

US 2023/0244972 A1 Aug. 3, 2023

(51) Int. Cl.

*G06N 10/00* (2022.01)
*G06N 10/20* (2022.01)
*G06N 10/80* (2022.01)

(52) U.S. Cl.

CPC ............. *G06N 10/20* (2022.01); *G06N 10/00* (2019.01); *G06N 10/80* (2022.01)

(58) Field of Classification Search

None

See application file for complete search history.

(56) References Cited

U.S. PATENT DOCUMENTS

| | | | | |
|---|---|---|---|---|
| 11,010,145 | B1 * | 5/2021 | Smith | G06F 8/41 |
| 11,086,665 | B2 | 8/2021 | Griffin et al. | |
| 2017/0228483 | A1 * | 8/2017 | Rigetti | G06N 10/40 |
| 2020/0074346 | A1 * | 3/2020 | Griffin | G06N 10/80 |
| 2020/0104747 | A1 * | 4/2020 | Nation | G06F 16/9024 |
| 2020/0116784 | A1 | 4/2020 | Liu et al. | |
| 2021/0012233 | A1 | 1/2021 | Gambetta et al. | |
| 2021/0152189 | A1 * | 5/2021 | Murali | G06N 10/20 |
| 2022/0012616 | A1 * | 1/2022 | Cherek | G06N 5/01 |
| 2022/0107786 | A1 * | 4/2022 | Iwasaki | G06N 10/60 |

FOREIGN PATENT DOCUMENTS

| | | | |
|---|---|---|---|
| WO | 2020056176 | A1 | 3/2020 |

OTHER PUBLICATIONS

Murali et al. "Software Mitigation of Crosstalk on Noisy Intermediate-Scale Quantum Computers" ASPLOS '20: Proceedings of the Twenty-Fifth International Conference on Architectural Support for Programming Languages and Operating Systems, pp. 1001-1016, https://doi.org/10.1145/3373376.3378477 (Year: 2020).*

Zhang, X. et al., "An efficient quantum circuits optimizing scheme compared with QISKit," arXiv:1807.01703v1 [cs.ET], Jul. 4, 2018, https://arxiv.org/pdf/1807.01703.pdf, 18 pages.

Zhang, Y. et al., "Optimizing Quantum Programs against Decoherence: Delaying Qubits into Quantum Superposition," 2019 International Symposium on Theoretical Aspects of Software Engineering (TASE), Jul. 29-Aug. 1, 2019, Guilin, China, IEEE, pp. 184-191.

* cited by examiner

*Primary Examiner* — Xuyang Xia
(74) *Attorney, Agent, or Firm* — Dority & Manning, P.A.

(57) ABSTRACT

The examples disclosed herein provide for optimizing a quantum request. In particular, a classical computing system receives at least one quantum computing request. The classical computing system obtains quantum operation data from at least one quantum computing device. The classical computing system modifies the at least one quantum computing request based on the quantum operation data to optimize execution of the at least one quantum computing request by the at least one quantum computing device. The classical computing system sends the modified at least one quantum computing request to the at least one quantum computing device.

13 Claims, 5 Drawing Sheets

OPTIMIZING A QUANTUM REQUEST

BACKGROUND

Quantum computing involves the use of quantum bits, referred to herein as "qubits," which have characteristics that differ from those of classical (i.e., non-quantum) bits used in classical computing. Qubits may be employed by quantum services that are executed by quantum computing devices.

SUMMARY

The examples disclosed herein provide for optimizing a quantum request. In particular, a classical computing system receives at least one quantum computing request. The classical computing system obtains quantum operation data from at least one quantum computing device. The classical computing system modifies the at least one quantum computing request based on the quantum operation data to optimize execution of the at least one quantum computing request by the at least one quantum computing device. The classical computing system sends the modified at least one quantum computing request to the at least one quantum computing device.

In one implementation, a method is provided. The method includes receiving, by a classical computing system comprising one or more processor devices, at least one quantum computing request. The method further includes obtaining, by the classical computing system, quantum operation data from at least one quantum computing device. The method further includes modifying, by the classical computing system, the at least one quantum computing request based on the quantum operation data to optimize execution of the at least one quantum computing request by the at least one quantum computing device. The method further includes sending, by the classical computing system, the modified at least one quantum computing request to the at least one quantum computing device.

In another implementation, a classical computing system is disclosed. The classical computing system includes a processor device to receive at least one quantum computing request. The processor device is further to obtain quantum operation data from at least one quantum computing device. The processor device is further to modify the at least one quantum computing request based on the quantum operation data to optimize execution of the at least one quantum computing request by the at least one quantum computing device. The processor device is further to send the modified at least one quantum computing request to the at least one quantum computing device.

In another implementation, a computer program product is disclosed. The computer program product is stored on a non-transitory computer-readable storage medium and includes instructions to cause a processor device of a classical computing system to receive at least one quantum computing request. The instructions further cause the processor device to obtain quantum operation data from at least one quantum computing device. The instructions further cause the processor device to modify the at least one quantum computing request based on the quantum operation data to optimize execution of the at least one quantum computing request by the at least one quantum computing device. The instructions further cause the processor device to send the modified at least one quantum computing request to the at least one quantum computing device.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum computing involves the use of quantum bits, referred to herein as "qubits," which have characteristics that differ from those of classical (i.e., non-quantum) bits used in classical computing. Qubits may be employed by quantum services that are executed by quantum computing devices.

Quantum request files, such as Quantum Assembly (QASM) files, are used to describe a service that will be executed within a quantum device. QASM files often include Qubit reservations, Qubit manipulations, gate manipulations, or the like. Classical computing systems and/or quantum computing systems generally need some way to manage multiple Quantum request files, such as by simultaneous execution or a queue.

In this regard, the examples herein disclose a classical computing service to optimize quantum request files before being forwarded to a quantum computing system for execution. In particular, the classical computing service may modify one or more quantum request files of a batch to optimize execution of the quantum request files, such as by optimizing simultaneous execution and/or an order of execution, whether in a single quantum computing device or across multiple quantum computing devices.

Figure 1:
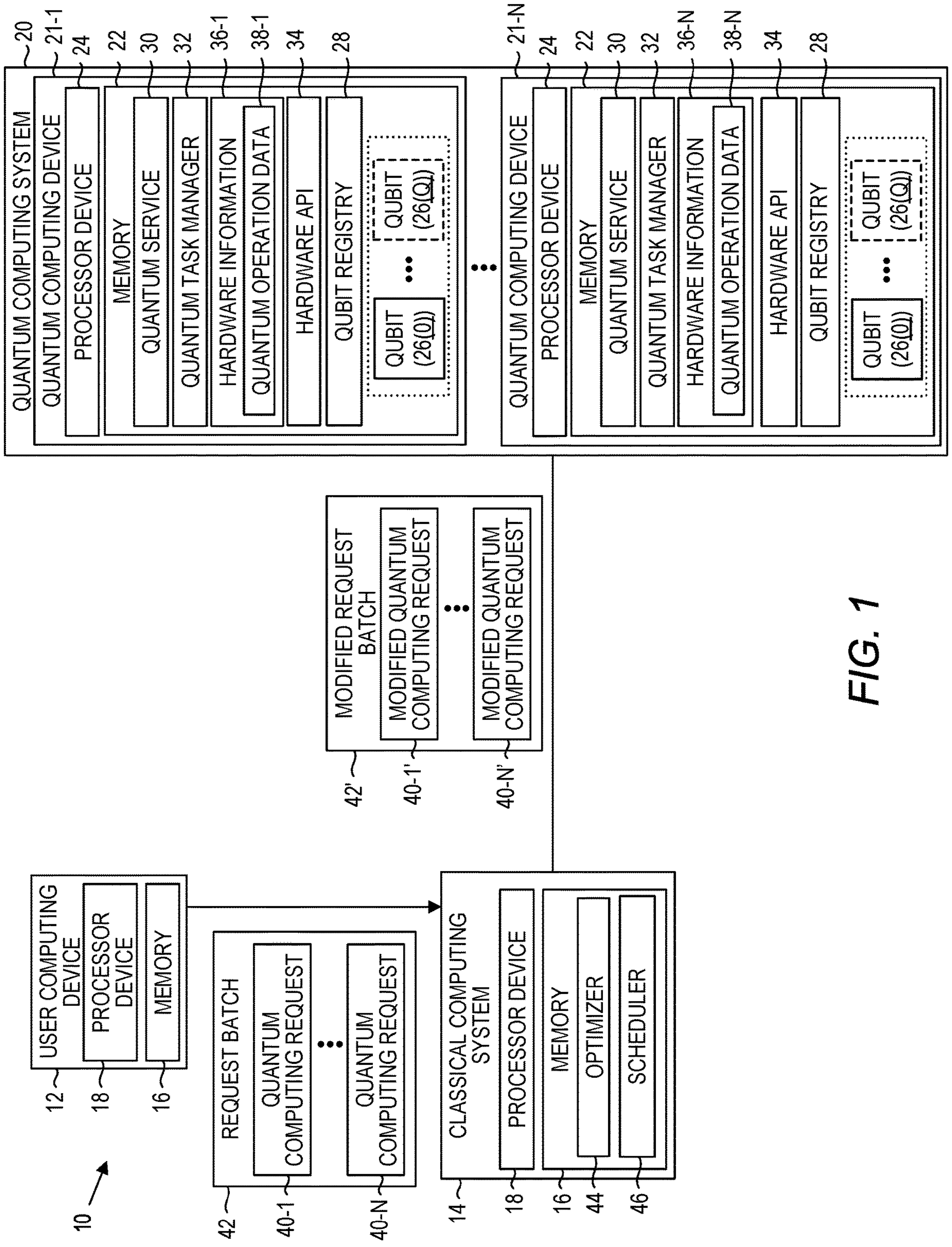
FIG. 1 is a block diagram of a computing system to optimize a quantum request, according to one example.

FIG. 1 is a block diagram of a computing system 10 according to one example. The computing system 10 includes a user computing device 12 and a classical computing system 14, which are classical computing devices including a memory 16 and a processor device 18. In certain implementations, the classical computing system 14 includes functionality provided by the user computing device 12. The computing system 10 includes a quantum computing system 20 with a plurality of quantum computing devices 21-1-21-N (generally referred to as quantum computing devices 21) that each include a system memory 22 and a processor device 24. The quantum computing devices 21 may also be referred to as quantum machines 21. The user computing device 12, the classical computing system 14, and/or the quantum computing system 20 are all communicatively coupled via a classical communications link (not shown), which may include a private network or a public network such as the internet. It is to be understood that the computing system 10, according to some examples, may include other quantum computing devices and/or classical computing devices that are not illustrated in FIG. 1. Additionally, the user computing device 12, the classical computing system 14, and/or the quantum computing system 20 in some examples may include constituent elements in addition to those illustrated.

In the example of FIG. 1, each quantum computing device 21 implements a set of one or more qubits 26(0)-26(Q) (referred to generally as qubits 26) for use by quantum services executed by the quantum computing device 21. To maintain information for the qubit(s) 26, the quantum computing devices 21 may each include a qubit registry 28, which includes a plurality of qubit registry entries, each corresponding to a qubit such as the one or more qubits 26. The qubit registry 28 maintains and provides access to data relating to the qubits implemented by the quantum computing device 21, such as a count of the total number of qubits implemented by the quantum computing device 21 and a count of the number of available qubits that are currently available for allocation, as non-limiting examples. Each of the qubit registry entries of the qubit registry 28 also stores qubit metadata for a corresponding qubit 26. The qubit metadata may include, as non-limiting examples, an identifier of the corresponding qubit, an availability indicator that indicates whether the corresponding qubit is available for use or is in use by a specific quantum service, an identifier of a quantum service that is associated with the corresponding qubit or to which the corresponding qubit is allocated, and/or an entanglement indicator that indicates whether the corresponding qubit is in an entangled state.

The quantum computing device 21 executes one or more quantum services 30. The quantum service 30 is a process that executes on a quantum computing device 21 and employs qubits 26 to provide desired functionality. The quantum service 30 is defined using a quantum service definition, such as provided by a quantum assembly (QASM) file, which includes one or more quantum programming instructions. QASM is a programming language that specifies quantum circuits as input to a quantum computer by declaring classical bits and qubits and describing operations on the qubits and measurements needed to obtain a classical result based on the qubits.

Execution of quantum services 30 is facilitated by a quantum task manager 32, which handles operations for creating, monitoring, and terminating quantum services 30. The quantum task manager 32 may provide an interface (not shown) through which other services or tasks may request specific information regarding the qubits 26, the quantum service 30, and/or the quantum computing device 21. Additionally, information regarding the status and functionality of the quantum computing device 21 and the elements thereof may be made accessible to other processes via a hardware application programming interface (API) 34.

Each quantum computing device 21 includes a physical enclosure containing qubits 26. Further, each quantum computing device 21 includes hardware information 36-1-36-N (referred to generally as hardware information 36). Hardware information 36 may include load, operating temperature, noise, error rate, last time rebooted, hardware load, or the like. The hardware information 36 may be general or time-sensitive information. For example, the hardware information 36 may include load-based parameters, such as a low processing load threshold, a high processing load threshold, a low qubit usage threshold, a high qubit usage threshold, a low application queue threshold, a high application queue threshold, or the like. Hardware information 36 may include event-based parameters, such as low operating temperature threshold, high operating temperature threshold, or the like. Hardware information 36 may further include global operating parameters, such as a time, time period, processing load, available memory, count of executing processes, application queue, qubit usage, count of available qubits 26, and/or operating temperature, or the like. The hardware information 36 may include global operating conditions, such as system load, system response time, operating temperature, state of the qubits (e.g., qubit age, coherence time, and/or the like), or the like.

Accordingly, hardware information 36 may include quantum operation data 38-1-38-N (referred to generally as quantum operation data 38), such as historical quantum operation data or current quantum operation data. The historical quantum operation data may provide generalized information about the general historical performance of the quantum computing device 21, such as whether the quantum computing device 21 typically operates at a high temperature. The current quantum operation data may provide time sensitive information of the quantum computing device, such as whether the quantum computing device 21 is currently operating at a high temperature.

Qubits 26 generally require very specific environmental conditions for operation. Quantum runs can vary significantly depending on operating conditions of the quantum computing device 21, such as processing load, temperature variance, maintenance schedule, implementation strategy, qubit type, or the like.

The user computing device 12 transmits a quantum computing request 40-1-40-N (referred to generally as quantum computing request 40). In particular, in certain implementations, the user computing device 12 transmits a single quantum computing request 40. In other implementations, the user computing device 12 transmits multiple quantum computing requests 40 in a request batch 42. Further, in certain implementations, the origination of the quantum computing requests 40 is within the classical computing system 14. In certain implementations, the quantum computing request 40 includes a QASM file including qubit data, qubit manipulation data, and/or gate manipulation data.

The classical computing system 14 includes an optimizer 44 to receive and process the one or more quantum computing requests 40. The optimizer 44 requests hardware information 36, such as quantum operation data 38, from the hardware API 34 of each of the quantum computing devices 21. The optimizer 44 analyzes the hardware information 36 and/or quantum operation data 38 to optimize execution of the quantum computing requests 40. In particular, the optimizer 44 modifies one or more quantum computing requests 40 to avoid conflicts and/or improve execution of the one or more quantum computing requests 40. The quantum operation data 38 may include processing speed, temperature, noise, error rate, hardware load, resource utilization, and/or qubit availability, or the like.

For example, in certain implementations, the optimizer 44 may receive a first quantum computing request 40 that reserves qubits 1, 2, and 3, and a second quantum computing request 40 that reserves qubits 3, 4, and 5. The optimizer 44 may then modify the second quantum computing request 40 to reserve qubits 6, 4, and 5. In certain implementations, the optimizer 44 may instead avoid the conflict by modifying the first quantum computing request 40 and/or the second quantum computing request 40 such that the first quantum computing request 40 executes and finishes execution before initiating execution of the second quantum computing request 40.

To improve execution of the one or more quantum computing requests 40, the optimizer 44 may modify one or more quantum computing requests 40 to increase parallel execution of the plurality of quantum computing requests, to maximize speed, maximize accuracy, minimize redundancy, and/or maximize payload distribution, or the like.

Once optimized, a modified quantum computing request 40-1'-40-N' (referred to generally as modified quantum computing request 40') of a modified request batch 42' may be sent by the classical computing system 14 to one or more quantum computing devices 21 of the quantum computing system 20. For example, the optimizer 44 forwards the modified quantum computing request 40' to a scheduler 46, which manages the routing of the quantum computing requests 40' to the quantum computing system 20. Accordingly, the optimizer 44 modifies the quantum computing request 40 to generate an optimized quantum computing request 40' identifying the optimal quantum computing device 21 and/or the optimal qubit type.

The scheduler 46 may schedule executions of quantum computing requests 40 in accordance with execution environment requirements in view of a current state of the quantum computing devices 21. Examples of the execution environment requirement(s) may include an error rate threshold, a channel load rate threshold for a quantum communication channel within the quantum computing system 20, a coherence time threshold for the quantum computer system and/or for each qubit provided by the quantum computer system, and a temperature threshold for a temperature of the quantum computer system, or the like.

In certain implementations, the optimizer 44 is configured to minimize circuit manipulation in a quantum computing device 21 or across multiple quantum computing devices 21 of a quantum computing system 20. For example, the optimizer 44 may analyze the overlap in quantum circuits between quantum computing requests 40 and/or the overlap in quantum circuits in a quantum computing request 40 and a current quantum circuit of a quantum computing device 21, or the like. Minimizing circuit manipulation decreases the execution delay between quantum computing requests 40.

It is noted that the conflict avoidance and optimization discussed above may be applied locally to a single quantum computing device 21 or globally across multiple quantum computing devices 21 in a quantum computing system 20. For example, in certain implementations, the optimizer 44 may be configured to take multiple request batches 42, each with multiple quantum computing requests 40, and modify the quantum computing requests 40 across multiple batches for efficient distribution across multiple quantum computing devices 21 of a quantum computing system 20.

In certain implementations, the optimizer 44 is configured to account for qubit type and/or executing quantum computing device 21. For example, in certain implementations, the optimizer 44 determines the optimal qubit type but is agnostic to which quantum computing device 21 executes the quantum computing request 40. In certain implementations, the optimizer 44 determines the optimal qubit type, and then, if there are multiple quantum computing devices 21 including the qubit type, the optimizer 44 further determines an optimal quantum computing device 21 of a plurality of quantum computing devices 21 to execute the quantum computing request 40.

In certain implementations, the optimizer 44 merges one or more quantum computing requests 40 into a single QASM file in an optimized way, allowing for a single service bundle to execute where dependencies can be identified, such as to allow for service orchestration capabilities.

Figure 2:
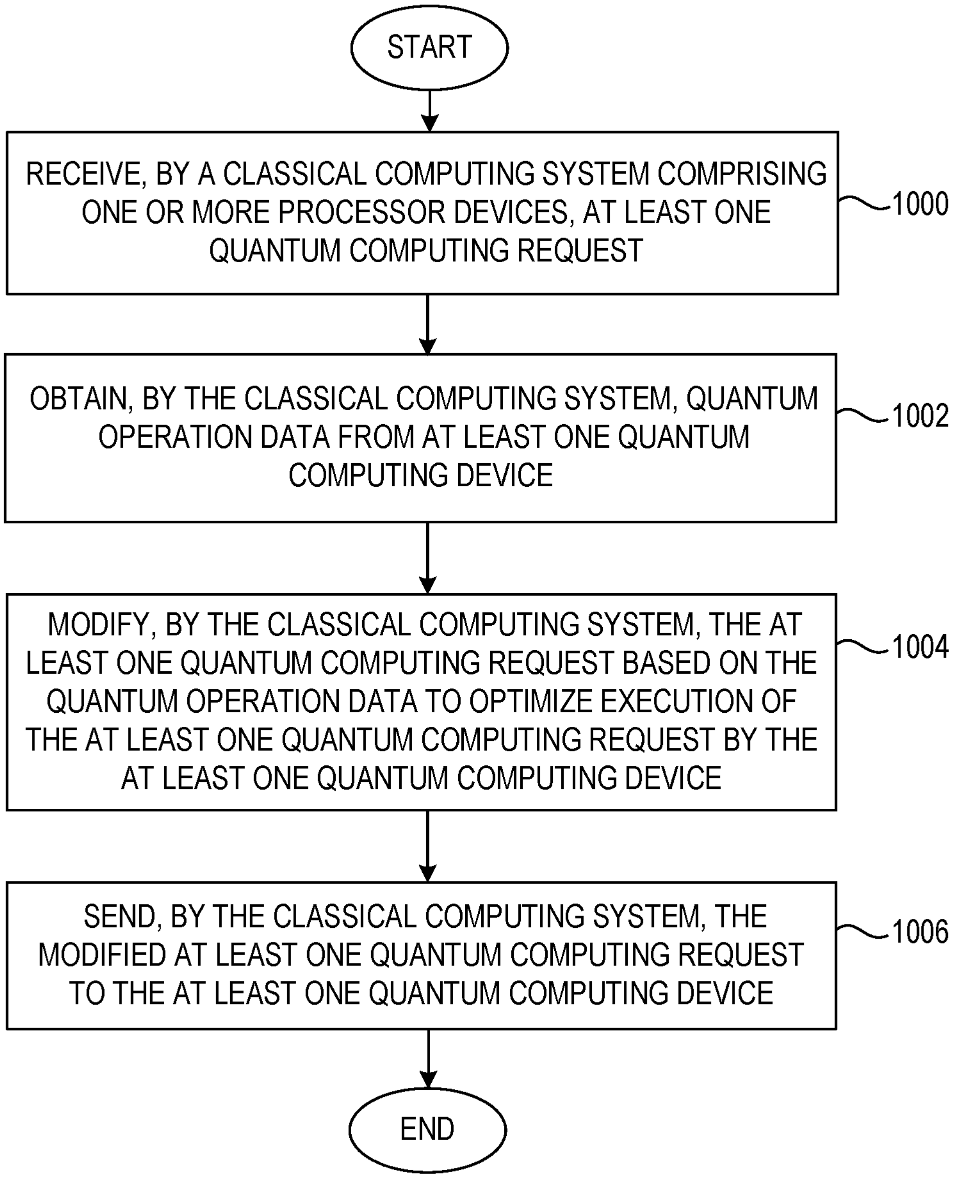
FIG. 2 is a flowchart of a method to optimize a quantum request, according to one example.

FIG. 2 is a flowchart of a method to optimize a quantum request according to one example. FIG. 2 will be discussed in conjunction with FIG. 1. A classical computing system 14 receives at least one quantum computing request 40 (1000). The classical computing system 14 obtains quantum operation data 38 from at least one quantum computing device 21 (1002). The classical computing system 14 modifies the at least one quantum computing request 40 based on the quantum operation data 38 to optimize execution of the at least one quantum computing request 40 by the at least one quantum computing device 21 (1004). The classical computing system 14 sends the modified at least one quantum computing request 40' to the at least one quantum computing device 21 (1006).

Figure 3:
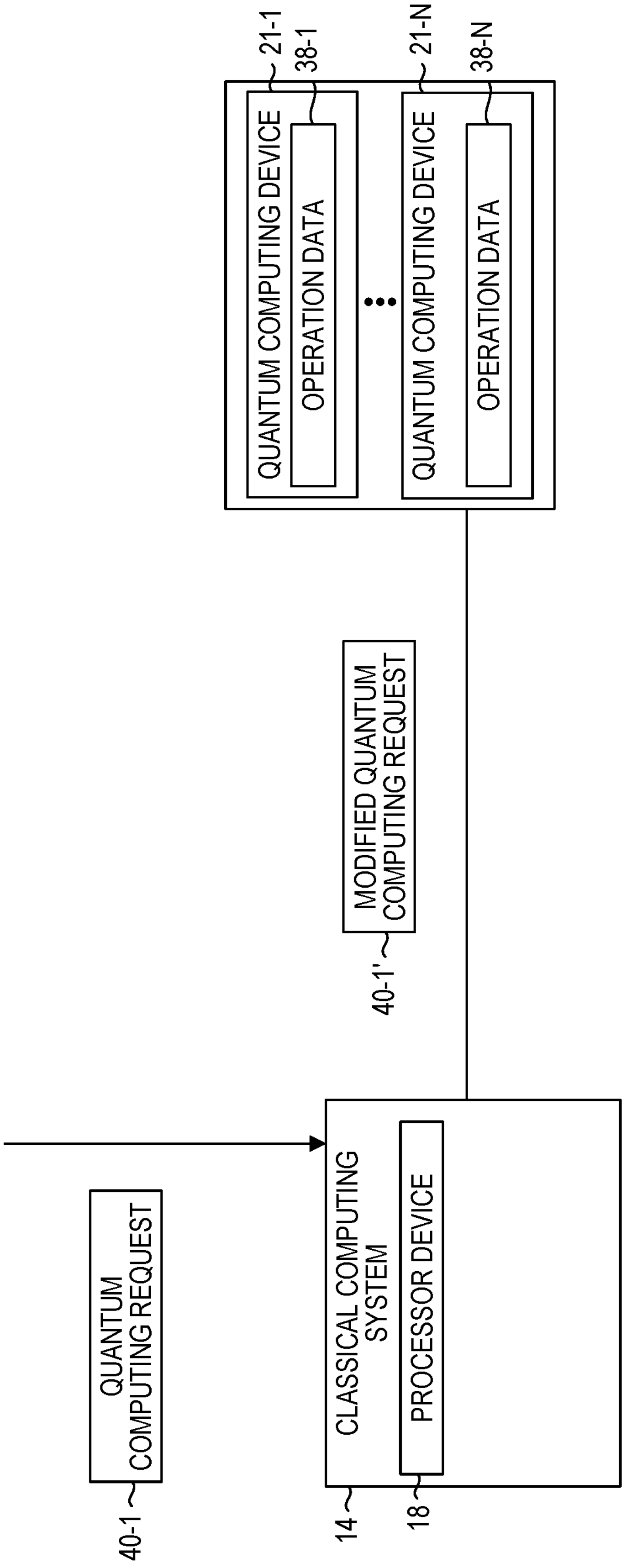
FIG. 3 is a simplified block diagram of the computing system illustrated in FIG. 1, according to one implementation.

FIG. 3 is a simplified block diagram of the processor device illustrated in FIG. 1, according to one implementation. In this example, the system includes a classical computing system 14 with a processor device 18. The classical computing system 14 receives at least one quantum computing request 40. The classical computing system 14 obtains quantum operation data 38 from at least one quantum computing device 21. The classical computing system 14 modifies the at least one quantum computing request 40 based on the quantum operation data 38 to optimize execution of the at least one quantum computing request 40 by the at least one quantum computing device 21. The classical computing system 14 sends the modified at least one quantum computing request 40' to the at least one quantum computing device 21.

Figure 4:
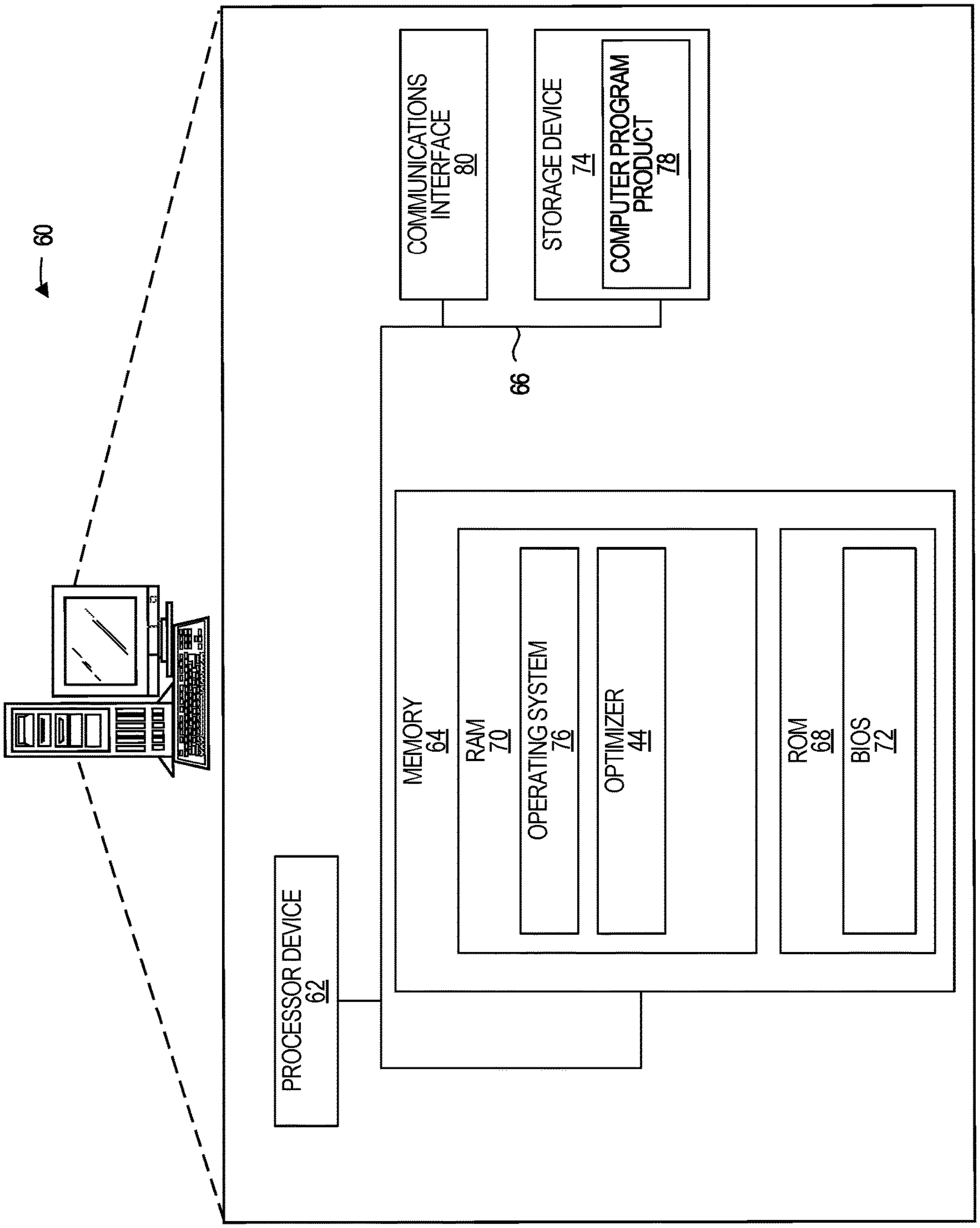
FIG. 4 is a block diagram of a computing device suitable for implementing one or more of the processing devices disclosed herein, according to one implementation.

FIG. 4 is a block diagram of a computing device 60 containing components suitable for implementing any of the processing devices disclosed herein. The computing device 60 includes a processor device 62, a system memory 64, and a system bus 66. The system bus 66 provides an interface for system components including, but not limited to, the system memory 64 and the processor device 62. The processor device 62 can be any commercially available or proprietary processor.

The system bus 66 may be any of several types of bus structures that may further interconnect to a memory bus (with or without a memory controller), a peripheral bus, and/or a local bus using any of a variety of commercially available bus architectures. The system memory 64 may include non-volatile memory 68 (e.g., read-only memory (ROM), erasable programmable read-only memory (EPROM), electrically erasable programmable read-only memory (EEPROM), or the like), and volatile memory 70 (e.g., random-access memory (RAM)). A basic input/output system (BIOS) 72 may be stored in the non-volatile memory 68 and can include the basic routines that help transfer information between elements within the computing device 60. The volatile memory 70 may also include a high-speed RAM, such as static RAM, for caching data.

The computing device 60 may further include or be coupled to a non-transitory computer-readable storage medium such as storage device 74, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 74 and other drives associated with computer-readable media and computer-usable media may provide non-volatile storage of data, data structures, computer-executable instructions, and the like.

A number of modules can be stored in the storage device 74 and in the volatile memory 70, including an operating system 76 and one or more program modules, which may implement the functionality described herein in whole or in part. All or a portion of the examples herein may be implemented as a computer program product 78 stored on a transitory or non-transitory computer-usable or computer-readable storage medium, such as the storage device 74, which includes complex programming instructions, such as complex computer-readable program code, to cause the processor device 62 to carry out the steps described herein. Thus, the computer-readable program code can comprise software instructions for implementing the functionality of the examples described herein when executed on the processor device 62. The processor device 62, in conjunction with the network manager in the volatile memory 70, may serve as a controller or control system for the computing device 60 that is to implement the functionality described herein.

The computing device 60 may also include one or more communication interfaces 80, depending on the particular functionality of the computing device 60. The communication interfaces 80 may comprise one or more wired Ethernet transceivers, wireless transceivers, fiber, satellite, and/or coaxial interfaces by way of non-limiting examples.

Figure 5:
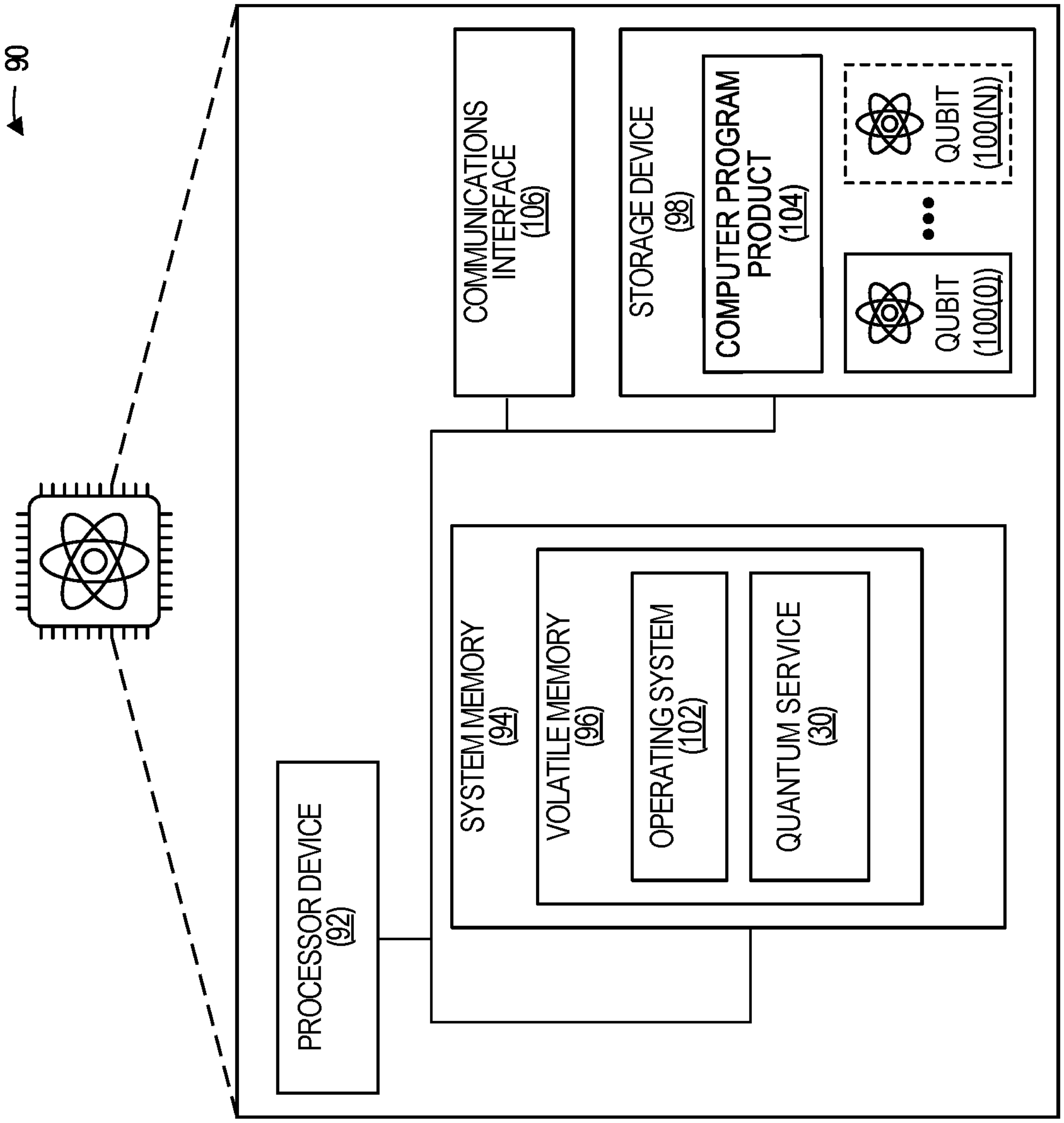
FIG. 5 is a block diagram of a quantum computing device suitable for implementing examples, according to one example.

FIG. 5 is a block diagram of a quantum computing device 90, such as the quantum computing device 21 of FIG. 1, suitable for implementing examples according to one example. The quantum computing device 90 may comprise any suitable quantum computing device or devices. The quantum computing device 90 can operate using classical computing principles or quantum computing principles. When using quantum computing principles, the quantum computing device 90 performs computations that utilize quantum-mechanical phenomena, such as superposition and entanglement. The quantum computing device 90 may operate under certain environmental conditions, such as at or near zero degrees) (0°) Kelvin. When using classical computing principles, the quantum computing device 90 utilizes binary digits that have a value of either zero (0) or one (1).

The quantum computing device 90 includes a processor device 92 and a system memory 94. The processor device 92 can be any commercially available or proprietary processor suitable for operating in a quantum environment. The system memory 94 may include volatile memory 96 (e.g., random-access memory (RAM)). The quantum computing device 90 may further include or be coupled to a non-transitory computer-readable medium such as a storage device 98. The storage device 98 and other drives associated with computer-readable media and computer-usable media may provide non-volatile storage of data, data structures, computer-executable instructions, and the like. The storage device may also provide functionality for storing one or more qubits 100(0)-100(N).

A number of modules can be stored in the storage device 98 and in the volatile memory 96, including an operating system 102 and one or more modules. All or a portion of the examples may be implemented as a computer program product 104 stored on a transitory or non-transitory computer-usable or computer-readable medium, such as the storage device 98, which includes complex programming instructions, such as complex computer-readable program code, to cause the processor device 92 to carry out the steps described herein. Thus, the computer-readable program code can comprise computer-executable instructions for implementing the functionality of the examples described herein when executed on the processor device 92.

An operator may also be able to enter one or more configuration commands through a keyboard (not illustrated), a pointing device such as a mouse (not illustrated), or a touch-sensitive surface such as a display device (not illustrated). The quantum computing device 90 may also include a communications interface 106 suitable for communicating with other quantum computing systems, including, in some implementations, classical computing devices.

Individuals will recognize improvements and modifications to the preferred examples of the disclosure. All such improvements and modifications are considered within the scope of the concepts disclosed herein and the claims that follow.

What is claimed is:

1. A method, comprising:

receiving, by a classical computing system comprising one or more processor devices, a plurality of quantum computing requests;

obtaining, by the classical computing system, quantum operation data from a plurality of quantum computing devices;

modifying, by the classical computing system, the plurality of quantum computing requests based on the quantum operation data to optimize execution of the plurality of quantum computing requests by the plurality of quantum computing devices, wherein modifying the plurality of quantum computing requests further comprises:

identifying, by the classical computing system, a quantum circuit overlap comprising a qubit conflict between a first quantum computing request and a second quantum computing request of the plurality of quantum computing requests; and modifying, by the classical computing system based on the quantum operation data and the identified quantum circuit overlap, at least one of the first quantum computing request or the second quantum computing request to obtain at least one modified quantum computing request that avoids the quantum circuit overlap such that the first quantum computing request executes and finishes execution on a first quantum computing device of the plurality of quantum computing devices before execution of the second quantum computing request is initiated on the first quantum computing device; and sending, by the classical computing system, the at least one modified at least one quantum computing request to the first quantum computing device.

2. The method of claim 1, wherein receiving, by the classical computing system, the plurality of quantum computing requests further comprises:

receiving, by the classical computing system, the plurality of quantum computing requests, the plurality of quantum computing requests comprising a Quantum Assembly (QASM) file.

3. The method of claim 1, wherein receiving, by the classical computing system, the plurality of quantum computing requests further comprises:

receiving, by the classical computing system, the plurality of quantum computing requests, the plurality of quantum computing requests comprising a Quantum Assembly (QASM) file, the QASM file comprising qubit data, qubit manipulation data, and gate manipulation data.

4. The method of claim 1, wherein obtaining, by the classical computing system, the quantum operation data from the plurality of quantum computing devices further comprises:

obtaining, by the classical computing system, the quantum operation data from the plurality of quantum computing devices, the quantum operation data comprising at least one of processing speed, temperature, noise, error rate, hardware load, or resource utilization.

5. The method of claim 1, wherein modifying, by the classical computing system, the plurality of quantum computing requests based on the quantum operation data to optimize execution of the at least one quantum computing request by the plurality of quantum computing devices further comprises:

modifying, by the classical computing system, the plurality of quantum computing requests based on the quantum operation data to optimize execution of the plurality of quantum computing requests by the plurality of quantum computing devices, the quantum operation data comprising current quantum operation data.

6. The method of claim 1, wherein modifying, by the classical computing system, the plurality of quantum computing requests based on the quantum operation data to optimize execution of the plurality of quantum computing requests by the plurality of quantum computing devices further comprises:

modifying, by the classical computing system, the plurality of quantum computing requests based on the quantum operation data to optimize execution of the plurality of quantum computing requests by the plurality of quantum computing devices, the quantum operation data comprising historical quantum operation data.

7. The method of claim 1, wherein modifying, by the classical computing system, the plurality of quantum computing requests based on the quantum operation data to optimize execution of the plurality of quantum computing requests by the plurality of quantum computing devices further comprises:

modifying, by the classical computing system, the plurality of quantum computing requests based on the quantum operation data to optimize execution of the plurality of quantum computing requests by the plurality of quantum computing devices, the quantum operation data comprising at least one of processing speed, temperature, noise, error rate, hardware load, or resource utilization.

8. The method of claim 1, wherein modifying, by the classical computing system, the plurality of quantum computing requests based on the quantum operation data to optimize execution of the plurality of quantum computing requests by the plurality of quantum computing devices further comprises:

modifying, by the classical computing system, the plurality of quantum computing requests based on the quantum operation data to optimize execution of the plurality of quantum computing requests, the quantum operation data comprising qubit availability.

9. The method of claim 1, wherein modifying, by the classical computing system, the plurality of quantum computing requests based on the quantum operation data to optimize execution of the plurality of quantum computing requests by the plurality of quantum computing devices further comprises:

modifying, by the classical computing system, the plurality of quantum computing requests based on the quantum operation data to avoid conflicts based on current operation of the plurality of quantum computing devices.

10. The method of claim 1, wherein modifying, by the classical computing system, the plurality of quantum computing requests based on the quantum operation data to optimize execution of the plurality of quantum computing requests by the plurality of quantum computing devices further comprises:

modifying, by the classical computing system, the plurality of quantum computing requests based on the quantum operation data to avoid conflicts between the plurality of quantum computing requests.

11. The method of claim 1, wherein modifying, by the classical computing system, the plurality of quantum computing requests based on the quantum operation data to optimize execution of the plurality of quantum computing requests by the plurality of quantum computing devices further comprises:

modifying, by the classical computing system, the plurality of quantum computing requests based on the quantum operation data to optimize execution of the plurality of quantum computing requests by the plurality of quantum computing devices, optimizing execution of the plurality of quantum computing requests to maximize speed, maximize accuracy, minimize redundancy, or maximize payload distribution.

12. A classical computing system comprising:

a processor device to:

receive at least one a plurality of quantum computing requests;

obtain quantum operation data from a plurality of quantum computing devices;

modify the plurality of quantum computing requests based on the quantum operation data to optimize execution of the plurality of quantum computing requests by the plurality of quantum computing devices, wherein, to modify the plurality of quantum computing requests, the processor device is further to:

identify a quantum circuit overlap comprising a qubit conflict between a first quantum computing request and a second quantum computing request of the plurality of quantum computing requests; and modify, based on the quantum operation data and the identified quantum circuit overlap, at least one of the first quantum computing request or the second quantum computing request to obtain at least one modified quantum computing request that avoids the quantum circuit overlap such that the first quantum computing request executes and finishes execution on a first quantum computing device of the plurality of quantum computing devices before execution of the second quantum computing request is initiated on the first quantum computing device; and send the at least one modified quantum computing request to the first quantum computing device.

13. A non-transitory computer-readable storage medium that includes executable instructions to cause a processor device of a classical computing system to:

receive a plurality of quantum computing requests;

obtain quantum operation data from a plurality of quantum computing devices;

modify the plurality of quantum computing requests based on the quantum operation data to optimize execution of the plurality of quantum computing requests by the plurality of quantum computing devices, wherein, to modify the plurality of quantum computing requests, the instructions are further to cause the processor device to:

identify a quantum circuit overlap comprising a qubit conflict between a first quantum computing request and a second quantum computing request of the plurality of quantum computing requests; and modify, based on the quantum operation data and the identified quantum circuit overlap, at least one of the first quantum computing request or the second quantum computing request to obtain at least one modified quantum computing request that avoids the quantum circuit overlap such that the first quantum computing request executes and finishes execution on a first quantum computing device of the plurality of quantum computing devices before execution of the second quantum computing request is initiated on the first quantum computing device; and send the at least one modified quantum computing request to the first quantum computing device.

* * * * *